(12) United States Patent
Garrec et al.

(10) Patent No.: US 11,642,779 B2
(45) Date of Patent: May 9, 2023

(54) AMBULATORY EXOSKELETON METHOD FOR CONTROLLING AN AMBULATORY EXOSKELETON

(71) Applicant: COMMISSARIAT A L'ENERGIE ATOMIQUE ET AUX ENERGIES ALTERNATIVES, Paris (FR)

(72) Inventors: Philippe Garrec, Gif sur Yvette (FR); Franck Geffard, Orsay (FR)

(73) Assignee: COMMISSARIAT A L'ENERGIE ATOMIOITE ET AUX ENERGIES ALTERNATIVES, Paris (FR)

( * ) Notice: Subject to any disclaimer, the term of this patent is extended or adjusted under 35 U.S.C. 154(b) by 951 days.

(21) Appl. No.: 16/314,963

(22) PCT Filed: Jul. 4, 2017

(86) PCT No.: PCT/EP2017/066696
§ 371 (c)(1),
(2) Date: Jan. 3, 2019

(87) PCT Pub. No.: WO2018/007414
PCT Pub. Date: Jan. 11, 2018

(65) Prior Publication Data
US 2019/0184547 A1    Jun. 20, 2019

(30) Foreign Application Priority Data
Jul. 4, 2016 (FR) .................................... 16 56377

(51) Int. Cl.
*B25J 9/00* (2006.01)
*A61H 3/00* (2006.01)
(Continued)

(52) U.S. Cl.
CPC .............. *B25J 9/0006* (2013.01); *A61H 1/02* (2013.01); *A61H 1/0237* (2013.01); *A61H 3/00* (2013.01);
(Continued)

(58) Field of Classification Search
CPC ...... A61F 2/68; A61F 2/70; A61F 2002/6818; A61F 2002/701; A61F 2002/704;
(Continued)

(56) References Cited

U.S. PATENT DOCUMENTS

| 8,251,930 B2 * | 8/2012 | Ido | A61H 1/0237 601/5 |
| 2007/0255454 A1 * | 11/2007 | Dariush | G06N 3/008 700/245 |

(Continued)

OTHER PUBLICATIONS

International Search Report of PCT/EP2017/066696 dated Sep. 6, 2017.

*Primary Examiner* — Jerrah Edwards
*Assistant Examiner* — Aren Patel
(74) *Attorney, Agent, or Firm* — Sughrue Mion, PLLC

(57) ABSTRACT

A method for controlling an ambulatory exoskeleton (1) linked to a user (100), comprising the following steps:
—measuring only the vertical component ($Z_{Ng}$, $Z_{Nd}$) of the pressure ($R_d$, $R_g$) under each foot (123, 133) of the user (1);
—controlling actuators (40, 41, 42, 43) such that the vertical component ($Z_{Ed}$, $Z_{Eg}$) of the resultant of the balancing forces ($R_{Eg}$, $R_{Ed}$) applied to the exoskeleton (1) and exerted by each foot (23, 33) of the exoskeleton (1) on the ground is a function of the vertical component ($Z_{Ng}$, $Z_{Nd}$) of the pressure ($R_d$, $R_g$) measured under the corresponding foot (123, 133) of the user (100).

13 Claims, 2 Drawing Sheets

(51) Int. Cl.
*B25J 9/16* (2006.01)
*B25J 19/00* (2006.01)
*A61H 1/02* (2006.01)

(52) U.S. Cl.
CPC ............ *B25J 9/1633* (2013.01); *B25J 19/007* (2013.01); *A61H 2003/007* (2013.01); *A61H 2201/164* (2013.01); *A61H 2201/165* (2013.01); *A61H 2201/1616* (2013.01); *A61H 2201/1642* (2013.01); *A61H 2201/1652* (2013.01); *A61H 2201/5061* (2013.01); *A61H 2201/5066* (2013.01); *A61H 2201/5069* (2013.01); *A61H 2201/5071* (2013.01); *A61H 2201/5084* (2013.01)

(58) Field of Classification Search
CPC ............. A61F 2002/7635; B25J 9/0006; B25J 19/007; B25J 9/1633; A61H 1/02; A61H 1/0237; A61H 3/00; A61H 2201/165; A61H 2201/5061; A61H 2201/5069; A61H 2201/5084; A61H 2201/5071; A61H 2201/1642; A61H 2201/1616; A61H 2003/007; A61H 2201/164; A61H 2201/1652
See application file for complete search history.

(56) References Cited

U.S. PATENT DOCUMENTS

| | | | |
|---|---|---|---|
| 2008/0255488 A1* | 10/2008 | Agrawal | A63B 69/0064 |
| | | | 602/23 |
| 2009/0210093 A1* | 8/2009 | Jacobsen | A61H 1/0255 |
| | | | 700/260 |
| 2010/0256537 A1 | 10/2010 | Menga | |
| 2017/0000682 A1* | 1/2017 | Harding | A61H 1/0262 |

* cited by examiner

AMBULATORY EXOSKELETON METHOD FOR CONTROLLING AN AMBULATORY EXOSKELETON

CROSS REFERENCE TO RELATED APPLICATIONS

This application is a National Stage of International Application No. PCT/EP2017/066696 filed Jul. 4, 2017, claiming priority based on French Patent Application No. 16 56377 filed Jul. 4, 2016.

FIELD OF THE INVENTION

The present invention relates to the field of assistive exoskeletons and more particularly to the control of the lower limbs of such an exoskeleton.

BACKGROUND OF THE INVENTION

An assistive exoskeleton is a mechanical structure which at least partially replicates that of the human skeleton and which improves or supplements the physical capabilities thereof. An exoskeleton is referred to as an ambulatory exoskeleton when it allows its user to walk with it. An ambulatory exoskeleton generally comprises a pelvis element which is linked to the body of a user and on which are articulated two lower limbs extending parallel to the lower limbs of the user. Each lower limb of the exoskeleton comprises a thigh segment to which is articulated a leg segment, a foot being articulated at the end of the leg segment. Complete control of each lower limb generally requires a first actuator for controlling the hip joint between the thigh segment and the pelvis element, a second actuator for controlling the knee joint between the thigh segment and the leg segment, and a third actuator for controlling the ankle joint between the leg segment and the foot. Each segment is connected to the user's limb along which it extends. A processing unit and a power supply, generally carried by the user and/or the pelvis element, control the various actuators of the exoskeleton in such a way as to maintain its balance.

Generally, the mass of the load applied to the exoskeleton (user+payload) is previously entered in the processing unit. This can, however, be measured by the exoskeleton itself. It is not uncommon to add an additional parameter, called assistance default, such that the user retains a partial feel of the forces acting on the exoskeleton. The processing unit evaluates in real time the relative positions of the thigh segment, the leg segment and the foot by means of rotary encoders associated with the actuators of the joints. It then determines the balancing torques to be applied to each joint by the actuators in order to keep the whole assembly (user+exoskeleton+payload) balanced. The processing unit then controls the actuators such that they apply the calculated balancing torques.

When the user wishes to change position, he exerts a force counter to the balancing torques applied to the joints by the actuators, and the processing unit updates the new balancing torques that are to be applied in order to maintain the balance of the assembly (user+exoskeleton+payload).

The known control methods based on a static equilibrium of the exoskeleton provide good performance for the slow passages from a first position of static equilibrium to a second position of static equilibrium. However, such a method proves to be particularly unsuitable for walking. The reason is that walking comprises alternating bipedal (bearing on both legs) and unipedal (bearing on one leg) situations in dynamic equilibrium. The known methods determine, at each change of situation, a set of balancing torques placing the assembly (exoskeleton+user+payload) in static equilibrium. Since walking is a succession of imbalance situations in which the body is leaning forward, the known methods do not permit a natural movement of the user wearing an exoskeleton that is controlled in this way. The user is then aware of a resistance from the exoskeleton during movement. In addition to creating a sense of insecurity, this resistance that is felt can prove dangerous in the event of a rapid reflex motion, for example in the case of regaining balance after a slip or when the user stumbles. Such behavior of the exoskeleton is an obstacle to the dissemination of this type of equipment.

It has been proposed to measure the forces and moments applied to the exoskeleton by using six-axis force sensors and/or accelerometers and to integrate these data in a dynamic calculation of the balancing torques that are to be applied. However, such sensors prove somewhat inaccurate and have significant drift, which can lead to dangerous situations for the exoskeleton. Furthermore, the integration and processing of the parameters (intensity, direction, sense) of the six elements measured require a very rapid calculation, which necessitates processing capabilities that are incompatible with the demands of portability of the processing unit (compactness and power consumption).

OBJECT OF THE INVENTION

It is an object of the invention to make available a method for controlling an ambulatory exoskeleton, improving the behavior of the exoskeleton in a walking situation and approximating the natural gait of a human being.

SUMMARY OF THE INVENTION

To this end, there is provided a method for controlling an ambulatory exoskeleton linked to a user, the exoskeleton comprising a pelvis element on which are articulated two lower limbs extending substantially parallel to the lower limbs of the user, each lower limb of the exoskeleton having a thigh segment articulated to a leg segment, which is itself articulated to a foot, the exoskeleton being provided with actuators controlling the rotation and/or the torque to be applied to the joints connecting the lower limbs to the pelvis element and to the joints connecting the thigh segments to the leg segments, each foot of the exoskeleton being connected to a corresponding foot of the user and comprising an interface on which a foot of the user rests, the exoskeleton likewise comprising measurement means for measuring the normal component, with respect to a bearing plane of the foot, of a bearing force under each foot of the user. According to the invention, the control method comprises the following steps:

measuring only the normal component, with respect to a bearing plane of the foot, of the bearing force at a first point under each foot of the user;

calculating a target value for the intensity of a vertical component of the resultant of the balancing forces applied to the exoskeleton, the resultant of the balancing forces being exerted at a second point of each foot of the exoskeleton, the target value of the vertical component of the resultant of the balancing forces applied to the exoskeleton being a function of the intensity of the normal component of the bearing force measured under the corresponding foot of the user;

inputting the target value calculated for the intensity of a vertical component of the resultant of the balancing forces applied to the exoskeleton, and also the value of the normal component, with respect to a bearing plane of the foot, of the bearing force measured under each foot of the user, into a model of the assembly user+ exoskeleton;

executing the model of the assembly user+exoskeleton in order to determine control setpoints to send to the actuators;

controlling the actuators according to the determined control setpoints.

Thus, the method makes it possible to use a single one-component sensor (uniaxial sensor, not multiaxial sensor) per foot, delivering a single information item. Processing this information requires only a small computing capacity, which makes it possible to establish very quickly the setpoints for controlling the actuators. The measurement of the vertical component of the bearing force under each foot of the user makes it possible to identify precisely the intention of the user to raise the foot in order to change from a bipedal situation to a unipedal situation. The direct relationship between the vertical balancing forces and the vertical component measured under the foot of the user permits continuous balancing of the assembly (exoskeleton+user+ payload). It was found that the behavior of the exoskeleton controlled in this way in a walking situation is very close to the natural gait of a human being.

The invention also relates to an exoskeleton comprising a pelvis element on which are articulated two lower limbs extending substantially parallel to the lower limbs of the user, each lower limb of the exoskeleton having a thigh segment articulated to a leg segment, which is itself articulated to a foot, each foot of the exoskeleton being connected to a corresponding foot of the user and comprising an interface on which the foot of the user rests, the exoskeleton being provided with actuators controlling the joints connecting the lower limbs to the pelvis element and the thigh segments to the leg segments, the joint articulating the foot to the leg segment remaining free, the exoskeleton likewise comprising measurement means for measuring the vertical component of a bearing force under each foot of the user, and a processing unit connected to the measurement means and to the actuators and arranged to implement the method of the invention.

Other features and advantages of the invention will become clear from reading the following description of particular non-limiting embodiments of the invention.

BRIEF DESCRIPTION OF THE DRAWINGS

Reference will be made to the attached figures, in which.

DETAILED DESCRIPTION OF THE INVENTION

Figure 1:
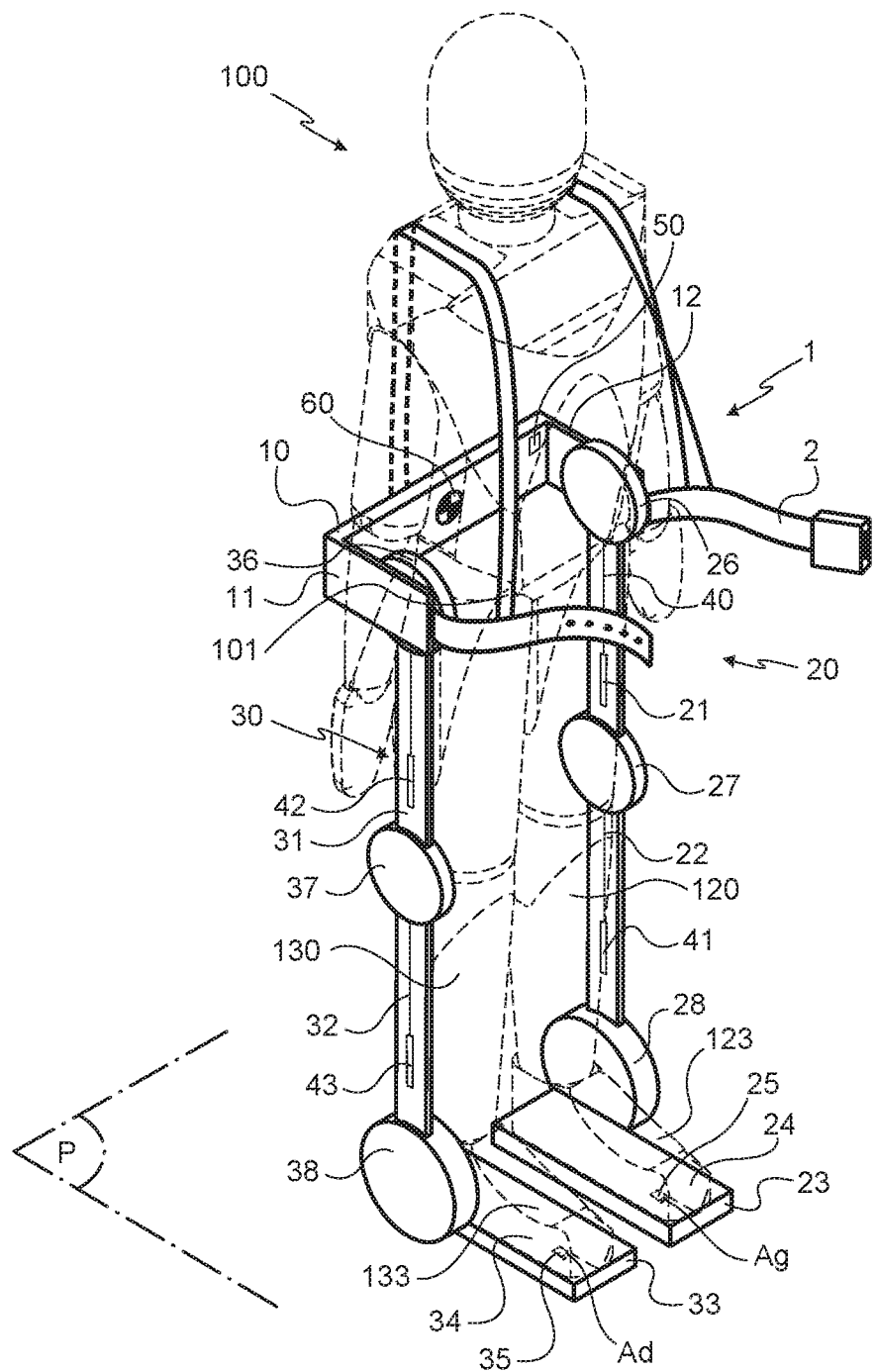
FIG. 1 is a schematic representation of a three-dimensional modeling of a user equipped with an exoskeleton according to the invention.

Referring to FIG. 1, the exoskeleton according to the invention is generally designated 1 and is worn by a user 100. The exoskeleton 1 comprises a pelvis element 10 situated substantially at the height of the pelvis 101 of the user 100. The exoskeleton 1 is connected to the user 100 with the aid of a set of belts and straps 2. A payload (not shown) can likewise be supported by the pelvis element 10. The exoskeleton 1 and its possible payload have a weight $P_E$ which will be designated in the remainder of the description as corresponding to the "weight of the exoskeleton".

Two lower limbs 20 and 30 of the exoskeleton 1 are respectively articulated on two ends 11 and 12 of the pelvis element 10 and extend substantially parallel to the lower limbs 120 and 130 of the user 100. The left lower limb 20 of the exoskeleton 1 has a thigh segment 21 articulated to a leg segment 22, which is itself articulated to a foot 23. The foot 23 of the left lower limb 20 comprises a planar interface 24 on which the left foot 123 of the user rests. A piezometric sensor 25 is placed between the planar interface 24 of the foot 23 of the exoskeleton 1 and the foot 123 of the user 100. This sensor 25 makes it possible to measure the vertical component of the bearing force $R_g$ under the foot 123 of the user 100. The joint 26 situated between the pelvis element 10 and the thigh segment 21 and the joint 27 situated between the thigh segment 21 and the leg segment 22 comprise actuators 40 and 41, respectively, here in the form of electrical cable jacks. The actuators 40 and 41 are provided with encoders for determining the relative angular position of the elements 11, 21 and 22. The joint 28 articulating the foot 23 to the leg segment 22 is without actuator and encoder. The foot 23 of the left lower limb 20 is thus freely articulated on the leg segment 22. This feature makes it possible in particular to reduce the amount of information to be processed and thus reduce the computing power of the processing means. This also makes it possible to minimize the costs of manufacture and instrumentation of the exoskeleton 1 and also the volume and mass of the moving parts, thereby reducing the internal inertia of the exoskeleton.

Similarly, the right leg 30 of the exoskeleton 1 has a thigh segment 31 articulated via a joint 36 to the pelvis element 10 and via a joint 37 to a leg segment 32, which is itself articulated to a foot 33 via a joint 38. The foot 33 comprises a planar interface 34 and a piezometric sensor 35 on which the right foot 133 of the user 100 rests. This sensor 35 makes it possible to measure the vertical component of the bearing force $R_d$ under the foot 133 of the user 100. The joints 36 and 37 comprise actuators 42 and 43, respectively, here in the form of electrical cable jacks provided with encoders for determining the relative position of the elements 12, 31 and 32. The foot 33 is freely articulated to the leg segment 32 via a joint 38.

The actuators 40 to 42 and their respective encoders and the sensors 25 and 35 are connected to a processing and control unit 50. The unit 50 comprises calculating means 51, an electric battery 52 and also means for controlling the actuators 40 to 42, in the form of an electrical signal generator 53.

The connections between the exoskeleton 1 and the user 100 are made at the feet 123 and 133 of the user 100 and at chest level. The thigh segments 21, 31 and the leg segments 22 and 32 are not connected to the user 100 and are therefore free with respect to the latter.

Figure 2:
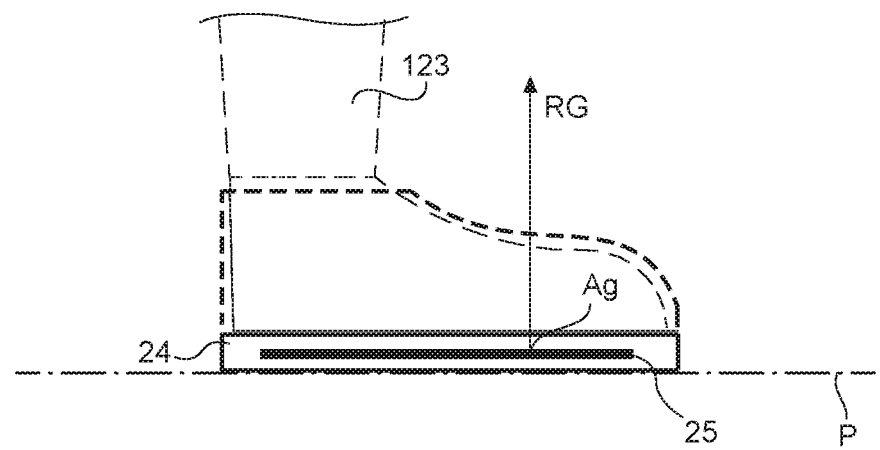
FIG. 2 is a schematic representation of a planar modeling, in a sagittal plane, of the user equipped with the exoskeleton from FIG. 1.
Figure 3:
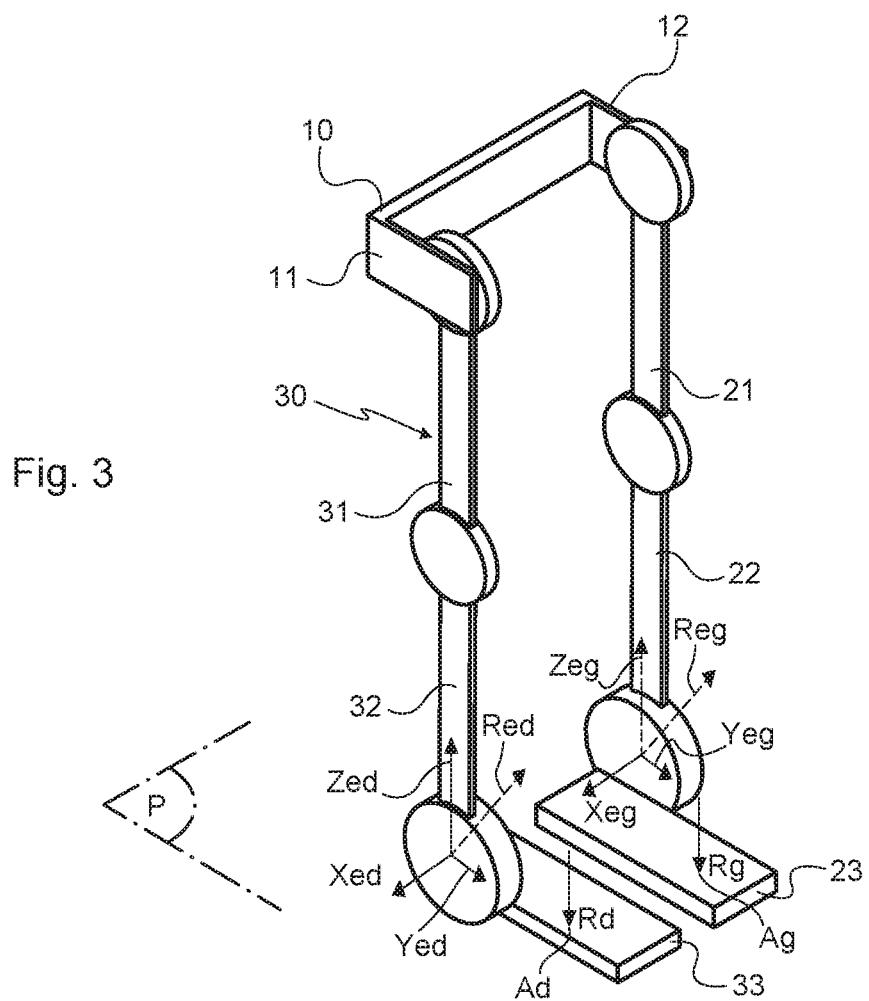
FIG. 3 is a schematic representation of a planar modeling, in a frontal plane, of the user equipped with the exoskeleton from FIG. 1.

The control of the exoskeleton will now be described with reference to FIGS. 1 to 3.

In the static phase, as in dynamic phase of walking, the sensors 25 and 35 respectively measure the intensities of the normal components $R_{Ng}$ and $R_{Nd}$ of the bearing forces $R_g$ and $R_d$. The normal components $R_{Ng}$ and $R_{Nd}$ are respectively the components of the bearing forces $R_g$ and $R_d$ measured perpendicularly to the respective bearing plane P of the feet 123 and 133. Here, these measurements are performed at a first left point $A_g$ and at a first right point $A_d$ respectively situated in line with the sensors 25 and 35. These measurements are transmitted to the unit 50. From the measured intensities of the normal components $R_{Ng}$ and $R_{Nd}$, the unit 50 then determines a series of control setpoints to be sent to the actuators 40, 41, 42 and 43 such that they apply, respectively to the joints 26, 27, 36 and 37, balancing torques for balancing the exoskeleton 100. The combination of these balancing torques results in a first balancing force $R_{Eg}$ applied by the exoskeleton 100 to the interface 24 of the left foot 23 and a second balancing force $R_{Ed}$ applied by the exoskeleton 100 to the interface 34 of the right foot 33. In an orthonormal coordinate system $O_G$ (x, y, z) linked to the center of the joint 28, the first balancing force $R_{Eg}$ comprises:
  a sagittal horizontal component $X_{Eg}$;
  a transverse horizontal component $Y_{Eg}$;
  a vertical component $Z_{Eg}$.

In an orthonormal coordinate system $O_d$ (x, y, z) linked to the center of the joint 38, the second balancing force $R_{Ed}$ comprises:
  a sagittal horizontal component $X_{Ed}$;
  a transverse horizontal component $Y_{Ed}$;
  a vertical component $Z_{Eg}$.

According to a first embodiment of the invention, the unit 50 instructs the actuators 40 to 43 to apply balancing torques in such a way that the intensity of the respective vertical components $Z_{Eg}$ and $Z_{Ed}$ of the resultants of the balancing forces $R_{Eg}$ and $R_{Ed}$ applied to the exoskeleton 1 and exerted at the center of the respective joints 28 and 38 of each foot 23 and 33 of the exoskeleton 1 is equal to target values which are written according to the affine law below:

$$Z_{Ed} = (\alpha_d * P_E) + b;$$

$$Z_{Eg} = (\alpha_g * P_E) + b';$$

with $$\alpha_d = R_{Nd}/(R_{Nd} + R_{Ng});$$

$$\alpha_g = R_{Ng}/(R_{Nd} + R_{Ng}).$$

The parameters b and b' are components independent of $R_{Nd}$ and $R_{Ng}$, which can be zero or can adopt the following discrete values:
  b is a non-zero constant if the intensity of the normal component of the bearing force measured under the left foot of the user $R_{Ng}$ is greater than a predefined lower threshold value equal to ten decanewtons;
  b is zero if the intensity of the normal component of the bearing force measured under the left foot of the user $R_{Ng}$ is less than a predefined lower threshold value equal to ten decanewtons;
  b' is a non-zero constant if the intensity of the normal component of the bearing force measured under the right foot of the user $R_{Nd}$ is greater than a predefined lower threshold value equal to ten decanewtons;
  b' is zero if the normal component of the bearing force measured under the right foot of the user $R_{Nd}$ is less than a predefined lower threshold value equal to ten decanewtons.

The values of the parameters b and b' may be linked, for example, to the reproducibility characteristics of the measurements of each of the sensors 25 and 35.

If it is desired to introduce a predefined default assistance $Z_B$ corresponding to a constant force applied by the exoskeleton 1 to the user 100, the target values of the intensities of the respective vertical components $Z_{Eg}$ and $Z_{Ed}$ of the resultants of the bearing forces $R_{Eg}$ and $R_{Ed}$ applied to the exoskeleton 1 and exerted on each foot 23 and 33 of the exoskeleton 1 become:

$$Z_{Ed} = \alpha_d * (P_E - Z_B) + b;$$

$$Z_{Eg} = \alpha_g * (P_E - Z_B) + b'.$$

According to one variant of the invention, the balancing of the vertical dynamic force exerted on the exoskeleton is improved when there is added to $P_E$ a term which is the product of the mass $m_E$ of the exoskeleton by the acceleration $d^2/dt^2$ ($Z_{GE}$) of its center of gravity, $Z_{GE}$ being the vertical component of the coordinates of the center of gravity $G_E$ of the exoskeleton 1 in any reference frame dissociated from the exoskeleton. The target values of the intensities of the respective vertical components $Z_{EG}$ and $Z_{Ed}$ of the resultants of the balancing forces $R_{Eg}$ and $R_{Ed}$ applied to the exoskeleton 1 and exerted on each foot 23 and 33 of the exoskeleton 1 become:

$$Z_{Ed} = \alpha d * (P_E + m_E * d^2/dt^2 (z_{GE}) - Z_B) + b;$$

$$Z_{Eg} = \alpha g * (P_E + m_E * d^2/dt^2 (z_{GE}) - Z_B) + b'.$$

The acceleration of the center of gravity $G_E$ of the exoskeleton 1 is measured with the aid of an accelerometer 60, or any other equivalent means, connected to the control unit 50.

In the case where the bearing plane P is inclined with respect to the horizontal by an angle $\alpha$, the above expressions of the target values of the intensities of the vertical components $Z_{Eg}$ and $Z_{Ed}$ remain unchanged if both feet 23 and 33 undergo the same inclination with respect to the horizontal.

In the case of uneven ground where the inclinations in a sagittal plane $\alpha_{23}$ and $\alpha_{33}$ respectively of the feet 23 and 33 with respect to the horizontal are different and have values above a threshold value $\alpha_{23,33MAX}$, the knowledge of the weight $P_g$ of the user 100 and the values of the inclinations $\alpha_{23}$ and $\alpha_{33}$ of each foot 23 and 33 are used to refine the calculation of the target values of the intensities of the vertical components of the resultants of the balancing forces $R_{Eg}$ and $R_{Ed}$ that are to be applied to the exoskeleton. The values of the angles $\alpha_{23}$ and $\alpha_{33}$ can be measured with the aid of inclinometers, and the values $R_{ng}^\alpha$ and $R_{Nd}^\alpha$ corresponding respectively to the normal components of the bearing forces $R_{Ng}$ and $R_{Nd}$ measured respectively under the left foot 23 and right foot 33 of the user 100, projected onto the vertical in order to take into account the inclination of the foot. These values are determined by virtue of an equilibrium model and supersede the measurements $R_{Ng}$ and $R_{Nd}$ in the above relationships when the angles $\alpha_{23}$ and $\alpha_{33}$ are greater than the value $\alpha_{23,33MAX} = 10$ degrees. The above relationships are then written:

$$R_{Ng}^\alpha = (X_g^2 + Y_g^2)^{1/2} * \sin(\arcsin(R_{Ng}/(X_g^2 + Y_g^2)^{1/2}) + \alpha_{23});$$

$$R_{dg}^\alpha = (X_d^2 + Y_d^2)^{1/2} * \sin(\arcsin(R_{Nd}/(X_d^2 + Y_d^2)^{1/2}) + \alpha_{33})$$

where $X_g$ is the sagittal horizontal component of the bearing force exerted by the left foot of the user 100 and determined using a model of the assembly exoskeleton 1+user 100;

$Y_g$ is the transverse horizontal component of the bearing force exerted by the left foot of the user 100 and determined using a model of the assembly exoskeleton 1+user 100;

$X_d$ is the sagittal horizontal component of the bearing force exerted by the right foot of the user 100 and determined using a model of the assembly exoskeleton 1+user 100;

$Y_d$ is the transverse horizontal component of the bearing force exerted by the right foot of the user 100 and determined using a model of the assembly exoskeleton 1+user 100.

The values of each of the balancing torques to be applied by the actuators 40 to 43 are determined as follows:
- measurements, by the sensors 25 and 35, of the respective normal components $R_{Ng}$ and $R_{Nd}$ of the bearing forces $R_g$ and $R_d$ measured at the bearing points $A_g$ and $A_d$;
- calculating the target values for the intensity of the respective vertical components $Z_{Ed}$ and $Z_{Eg}$ of the resultants of the balancing force $R_{Eg}$ and $R_{Ed}$ applied to the exoskeleton 1, from one of the preceding affine laws;
- inputting the target values calculated for the intensity of the vertical components $Z_{Ed}$ and $Z_{Eg}$ of the resultant of the balancing forces $R_{Eg}$ and $R_{Ed}$ applied to the exoskeleton 1, and also the value of the normal component $R_{Ng}$ and $R_{Nd}$, with respect to a bearing plane P of the feet 123 and 133, of the bearing force $R_d$ and $R_g$ measured under each foot 123 and 133 of the user 100, into an equilibrium model of the assembly user (100)+exoskeleton (1);
- the unit 50 executes the two-dimensional or three-dimensional (static or dynamic) equilibrium model of the assembly user 100+exoskeleton 1 and determines the values of the horizontal components ($X_{Eg}$ and $X_{Ed}$, or even $Y_{Eg}$, $Y_{Ed}$ in the case of a three-dimensional model) of the balancing forces $R_{Eg}$ and $R_{Ed}$;
- the control setpoints to be sent to the actuators 40 to 43 are deduced, for example, with the aid of a transposed Jacobian matrix of the exoskeleton 1.

Different models of the assembly exoskeleton 1+user 100 may be used to determine the horizontal components of the balancing forces to be applied. These models are known to a person skilled in the art, and some of them are in particular described in the following documents: Mechatronics 24 (2014) 168-176; 40th Southeastern Symposium on System Theory University of New Orleans, Mar. 16-18, 2008 TA1.4; Advanced Robotics, vol. 20, no. 9, pages 989-1014 (2006).

A possible example of a three-dimensional static model is given below:

$$\begin{cases} (1)\ X_{E_g} + X_{E_d} + X_B = 0 \\ (3)\ Z_{E_g} + Z_{E_d} + Z_B - P_E = 0 \\ (4)\ Z_{E_g} y_g + Z_B y_B - P_E y_{G_E} = 0 \\ (5)\ X_{E_g} z_g - Z_{E_g} x_g + X_B z_B - Z_B x_B + P_E x_{G_E} = 0 \\ (6)\ -X_{E_g} y_g - X_B y_B = 0 \end{cases}$$

where the variables are:

$X_B$: sagittal horizontal force applied by the operator at the region of the chest (trunk) by virtue of a suitable connection.

$Z_B$: vertical force applied by the operator at the region of the chest (trunk) by virtue of a suitable connection corresponding to the default assistance $x_B$: sagittal coordinate of the point of application of the force applied by the operator at the region of the chest in the orthonormal coordinate system $y_B$: transverse coordinate of the point of application of the force applied by the operator at the region of the chest in the orthonormal coordinate system $z_B$: vertical coordinate of the point of application of the force applied by the operator at the region of the chest in the orthonormal coordinate system $x_g$: sagittal coordinate of the left foot in the orthonormal coordinate system $y_g$: transverse coordinate of the left foot in the orthonormal coordinate system $Z_g$: vertical coordinate of the left foot in the orthonormal coordinate system $x_{GE}$: sagittal coordinate of the center of gravity of the exoskeleton in the orthonormal coordinate system $Y_{CE}$: transverse coordinate of the center of gravity of the exoskeleton in the orthonormal coordinate system.

According to a second embodiment of the invention, a predefined default assistance $Z_B$ is input in the control unit 50. The default assistance $Z_B$ corresponds to a constant force applied by the exoskeleton 1 to the user 100 and entails that the user always feels some of the weight $P_E$ of the exoskeleton 1. Such a default assistance $Z_B$ can have the purpose of retaining a minimum tension in all of the belts and straps 2 that bind the exoskeleton 1 to the user 100.

In this second embodiment, the unit 50 instructs the actuators 40 to 43 to apply balancing torques in such a way that the intensity of the respective vertical components $Z_{Eg}$ and $Z_{Ed}$ of the resultants of the balancing forces $R_{Eg}$ and $R_{Ed}$ applied to the exoskeleton 1 and exerted on each foot 23 and 33 of the exoskeleton 1 is written:

$$Z_{Ed} = K^* R_{Nd};$$

$$Z_{Eg} = K^* R_{Ng};$$

in which K is a coefficient of proportionality equal to: $K = (P_E - Z_B)/(P_U + Z_B)$.

In the case of uneven ground where the inclinations in a sagittal plane $\alpha_{23}$ and $\alpha_{33}$ respectively of the feet 23 and 33 with respect to the horizontal have values above a threshold value $\alpha_{23,33MAX}$, the knowledge of the weight $P_U$ of the user 100 and the values of the inclinations $\alpha_{23}$ and $\alpha_{33}$ of each foot 23 and 33 make it possible to refine the calculation of the target values of the intensities of the vertical components of the resultants of the balancing forces $R_{Eg}$ and $R_{Ed}$ that are to be applied to the exoskeleton. The values of the angles $\alpha_{23}$ and $\alpha_{33}$ can be measured with the aid of inclinometers, and the values $R_{ng}^{\alpha}$ and $R_{Nd}^{\alpha}$ weighted to replace the measurements $R_{Ng}$ and $R_{Nd}$ in the above relationships when the angles $\alpha_{23}$ and $\alpha_{33}$ are greater than the value $\alpha_{23,33MAX} = 10$ degrees are written:

$$R_{Ng}^{\alpha} = R_{Ng}^* \cos(\alpha_{23});$$

$$R_{Nd}^{\alpha} = R_{Nd}^* \cos(\alpha_{33}).$$

The methods according to the above embodiments can be improved by the addition of a supplementary step of saturation of the intensity of the respective vertical components $Z_{Ed}$ and $Z_{Eg}$ of the resultants of the balancing forces $R_{EG}$ and $R_{Ed}$ applied to the exoskeleton 1 and exerted respectively on the foot 23 and 33 of the exoskeleton 1.

This step is carried out after the determination, by the unit 50, of the values of the intensity of the vertical components $Z_{Ed}$ and $Z_{Eg}$ as a function of the intensity of the vertical components $R_{Nd}$ and $R_{Ng}$ measured under the foot 123 or 133 of the user. A logic test is applied to the values of the control setpoints determined by the unit 50 before sending them to the actuators 40 to 43. For example, when the user 100 wants to raise the left foot 123, the intensity of the normal component $R_{Ng}$ of the bearing force $R_g$ measured under the left foot 123 of the user 100 decreases from a value substantially equal to half the weight $P_U$ of the user 100 to 0, while the intensity of the normal component $R_{Nd}$ of the bearing force $R_d$ measured under the right foot 133 of the user 100 increases from a value substantially equal to half the weight $P_U$ of the user 100 to a value substantially equal to the full weight $P_U$ of the user 100. During the supplementary step of saturation, the unit 50 monitors the value of the normal component $R_{Nd}$ of the bearing force $R_d$ measured under the right foot 133 of the user 100 and identifies the moment $T_s$ at which the value of the normal component $R_{Nd}$ exceeds a predefined upper threshold value $R_{NdS}$, fixed here at 70% of the weight $P_U$ of the user 100. At this moment $T_s$, the unit 50 controls the actuators 40 to 43 in such a way that the intensity of the vertical component $Z_{Ed}$ of the resultant $R_{Ed}$ of the balancing forces applied to the exoskeleton 1 and exerted on the foot 33 of the exoskeleton 1 is equal to a saturated value, this saturated value here being equal to the weight $P_E$ of the exoskeleton 1. A similar saturation step is applied to the resultant $R_{Eg}$ of the balancing forces applied to the exoskeleton 1 and exerted on the foot 23 of the exoskeleton 1.

Alternatively, the saturated value is equal to the weight $P_E$ of the exoskeleton 1 augmented by the product of its mass by the vertical acceleration of its center of gravity G and/or the upper threshold value is between 0.5 decanewtons and 10 decanewtons. The acceleration of the center of gravity G of the exoskeleton 1 is measured with the aid of an accelerometer 60, or any other equivalent means, connected to the control unit 50.

Although some static imbalances remain, particularly as regards the rotation moments about the axes AX, AY and AZ, the inventors have noted that a control method comprising the generation of a setpoint for controlling the actuators 40 to 43 to apply a set of balancing forces, of which the vertical component of the resultant $R_{Nd}$ and $R_{Ng}$ exerted on each foot 33 and 23 by the exoskeleton on the ground is proportional to the vertical component $Z_{Ed}$ and $Z_{Eg}$ measured under the foot 133 and 123, respectively, improved the behavior of the exoskeleton in a walking situation.

The comfort and the sense of security felt by the user 100 are greatly improved. The absence of residual static moments on the user 100 also permits improved comfort of the latter.

The simplicity of the measurement, and the determination of the balancing forces from this measurement, reduces the required computing power and improves the fluidity of the exoskeleton in a walking situation.

Of course, the invention is not limited to the described embodiment and instead encompasses any variant falling within the scope of the invention as defined by the claims.

In particular,
- although the user is linked here to the exoskeleton 1 with the aid of a set of belts and straps, the invention likewise applies to other means of fastening the user to the exoskeleton, for example a set of rigid elements, a belt or self-adhesive strips;
- although each foot of the lower limbs of the exoskeleton comprises a planar interface on which a foot of the user rests, the invention also applies to other types of interface between the foot of the exoskeleton and the foot of the user, for example a linear interface, a punctiform interface or an interface comprising a plurality of mutually articulated surfaces;
- although the vertical component of the bearing force under each foot of the user is measured here by means of a piezometric sensor, the invention likewise applies to other means of measuring the bearing force under the foot of the user, for example a strain gauge;
- although the actuators here are powered with the aid of an electric battery, the invention likewise applies to other types of energy sources, for example an electrical cable, pneumatic energy or a combustion engine;
- although the lower threshold value is here equal to ten decanewtons, the invention likewise applies to other predefined lower threshold values, for example a first predefined threshold value of between 0.5 and 10 decanewtons;
- although the upper threshold value is here equal to 70% of the weight of the user, the invention likewise applies to other predefined upper threshold values, for example a predefined upper threshold value of between 70% and 95% of the weight of the user of the exoskeleton, or an upper threshold value of between 0.5 decanewtons and 10 decanewtons;
- although the saturated constant value is here equal to the weight of the exoskeleton, the invention likewise applies to other saturated constant values, for example with a fraction of the weight of the exoskeleton being able to vary between 80 and 100% of the weight of the exoskeleton;
- the weight P; of the user can be measured by weighing the user before he puts on the exoskeleton and introduced in unit 50 or by a measurement performed by the sensors of the exoskeleton;
- although the balancing forces applied to the exoskeleton are here applied at the center of the joints, the invention likewise applies to other second points of application of the balancing forces, for example under the foot of the user or at the heel of the user when, for example, the exoskeleton is provided with a ankle actuator;
- although the first points at which the normal components of the bearing force of each foot are measured are here different from the second points at which the vertical components of the resultants of the balancing forces are intended to be applied, the invention likewise applies to identical first and second points for each foot;
- although weighted values here replace the values of the measurements of the normal force to the bearings when the angles of inclination of the feet are greater than a threshold value of 10 degrees, the invention likewise applies to other threshold values, for example 5, 15 or 30 degrees or any desired value;
- although the values of the horizontal components of the balancing forces are here determined with the aid of a static equilibrium model of the exoskeleton, the invention likewise applies to the use of any equilibrium model of the exoskeleton, for example those described in the prior art disclosed in the application.

The invention claimed is:

1. A method for controlling an ambulatory exoskeleton linked to a user implemented by a processing and control unit operably connected to the exoskeleton, the exoskeleton comprising a pelvis element on which are articulated two lower limbs extending substantially parallel to the lower limbs of the user, each lower limb of the exoskeleton having a thigh segment articulated to a leg segment, which is itself articulated to a foot, the exoskeleton being provided with actuators controlling the rotation and/or the torque to be applied to the joints connecting the lower limbs to the pelvis element and to the joints connecting the thigh segments to the leg segments, each foot of the exoskeleton being connected to a corresponding foot of the user and comprising an interface on which a foot of the user rests, the exoskeleton likewise comprising measurement means for measuring the normal component, with respect to a bearing plane of the foot, of a bearing force under each foot of the user, the control method comprises the following steps:

measuring only the normal component, with respect to a bearing plane of the foot, of the bearing force at a first point under each foot of the user;

the processing and control unit calculating a target value for the intensity of a vertical component of the resultant of balancing forces applied to the exoskeleton, the resultant of the balancing forces being exerted at a second point of each foot of the exoskeleton, the target value of the vertical component of the resultant of the balancing forces applied to the exoskeleton being a function of the intensity of the normal component of the bearing force measured under the corresponding foot of the user;

the processing and control unit inputting the target value calculated for the intensity of a vertical component of the resultant of the balancing forces applied to the exoskeleton, and also the value of the normal component, with respect to a bearing plane of the foot, of the bearing force measured under each foot of the user, into a model of the assembly user and exoskeleton;

the processing and control unit executing the model of the assembly user and exoskeleton in order to determine values of horizontal components of the balancing forces applied to the exoskeleton;

the processing and control unit determining control setpoints to send to the actuators on the basis of at least said values of horizontal components of the balancing forces applied to the exoskeleton;

the processing and control unit controlling the actuators according to the determined control setpoints so that the actuators apply respective balancing torques for balancing the exoskeleton.

2. The method as claimed in claim 1, in which the target value for the intensity of the vertical component of the resultant of the balancing forces applied to the exoskeleton and exerted on each foot of the exoskeleton is written:

$Z_{Ed} = \alpha_d *(P_E - Z_B) + b;$ $Z_{Eg} = \alpha_g *(P_E - Z_B) + b';$ with $\alpha_d = R_{Nd}/(R_{Nd} + R_{Ng});$ $\alpha_g = R_{Ng}/(R_{Nd} + R_{Ng});$ in which $Z_{Ed}$ is the vertical component of the resultant of the balancing forces applied to the right foot of the exoskeleton;

$Z_{Eg}$ is the vertical component of the resultant of the balancing forces applied to the left foot of the exoskeleton;

$R_{Nd}$ is the normal component of the bearing force measured under the right foot of the user;

$R_{Ng}$ is the normal component of the bearing force measured under the left foot of the user (100);

$P_E$ is the weight of the exoskeleton;

$Z_B$ is a predefined default assistance corresponding to a constant force applied by the exoskeleton to the user;

b and b' are components independent of the bearing forces measured under the feet of the user.

3. The method as claimed in claim 2, in which the components b and b' adopt the following discrete values:

b is a non-zero constant if the intensity of the normal component of the bearing force measured under the left foot of the user is greater than a predefined lower threshold value;

b is zero if the intensity of the normal component of the bearing force measured under the left foot of the user is less than a predefined lower threshold value;

b' is a non-zero constant if the intensity of the normal component of the bearing force measured under the right foot of the user is greater than a predefined lower threshold value;

b' is zero if the normal component of the bearing force measured under the right foot of the user is less than a predefined lower threshold value.

4. The method as claimed in claim 1, in which the intensity of the vertical component of the resultant of the balancing forces applied to the exoskeleton and exerted on each foot of the exoskeleton is written:

$Z_{Ed} = \alpha_d *(P_E - Z_B) + b;$ $Z_{Eg} = \alpha_g *(P_E - Z_B) + b';$ with $\alpha_d = R_{Nd}^\alpha/(R_{Nd}^\alpha + R_{Ng}^\alpha);$ $\alpha_g = R_{Ng}^\alpha/(R_{Nd}^\alpha + R_{Ng}^\alpha);$ in which $Z_{Ed}$ is the vertical component of the resultant of the balancing forces applied to the right foot of the exoskeleton;

$Z_{Eg}$ is the vertical component of the resultant of the balancing forces applied to the left foot of the exoskeleton;

$R_{Nd}^\alpha$ is the normal component of the bearing force measured under the right foot of the user, projected onto the vertical in order to take into account the inclination of the foot by virtue of an equilibrium model and of the measurement of the inclination of the foot;

$R_{Ng}^\alpha$ is the normal component of the bearing force measured under the left foot of the user projected onto the vertical in order to take into account the inclination of the foot;

$P_E$ is the weight of the exoskeleton;

$Z_B$ is a predefined default assistance corresponding to a constant force applied by the exoskeleton to the user;

b and b' are components independent of the bearing forces measured under the feet of the user.

5. The method as claimed in claim 1, in which the intensity of the vertical component of the resultant of the balancing forces applied to the exoskeleton and exerted on each foot of the exoskeleton is written:

$Z_{Ed} = \alpha_d *(P_E - Z_B) + b;$ $Z_{Eg} = \alpha_g *(P_E - Z_B) + b';$ with $\alpha_d = R_{Nd}^\alpha/(R_{Nd}^\alpha + R_{Ng}^\alpha);$ $\alpha_g = R_{Ng}^\alpha/(R_{Nd}^\alpha + R_{Ng}^\alpha);$ in which $Z_{Ed}$ is the vertical component of the resultant of the balancing forces applied to the right foot of the exoskeleton;

$Z_{Eg}$ is the vertical component of the resultant of the balancing forces applied to the left foot of the exoskeleton;

$R_{Nd}{}^{\alpha}$ is the normal component of the bearing force measured under the right foot of the user, projected onto the vertical in order to take into account the inclination of the foot by virtue of an equilibrium model and of the measurement of the inclination of the foot;

$R_{Ng}{}^{\alpha}$ is the normal component of the bearing force measured under the left foot of the user, projected onto the vertical in order to take into account the inclination of the foot;

$P_E$ is the weight of the exoskeleton;

$m_E * d^2/dt^2(z_{GE})$ is the product of the mass of the exoskeleton by the acceleration of its center of gravity, $Z_B$ is a predefined default assistance corresponding to a constant force applied by the exoskeleton to the user;

b and b' are components independent of the bearing forces measured under the feet of the user.

6. The method as claimed in claim 1, in which the lower threshold value is between 0.5 decanewtons and 10 decanewtons.

7. The method as claimed in claim 1, in which the target value for the intensity of the vertical component of the resultant of the balancing forces applied to the exoskeleton and exerted on each foot of the exoskeleton is written:

$$Z_{Ed}=K*R_{Nd};$$

$$Z_{Eg}=K*R_{Ng};$$

with $$K=(P_E-Z_B)/(P_U+Z_B)$$

in which $Z_{Ed}$ is the vertical component of the resultant of the balancing forces applied to the exoskeleton and measured under the right foot of the exoskeleton;

$Z_{Eg}$ is the vertical component of the resultant of the balancing forces applied to the exoskeleton and measured under the left foot of the exoskeleton;

$R_{Nd}$ is the normal component of the bearing force measured under the right foot of the user;

$R_{Ng}$ is the normal component of the bearing force measured under the left foot of the user;

$P_E$ is the weight of the exoskeleton;
$P_U$ is the weight of the user;
$Z_B$ is a predefined default assistance corresponding to a constant force applied by the exoskeleton to the user.

8. The method as claimed in claim 1, in which the target value for the intensity of the vertical component of the resultant of the balancing forces applied to the exoskeleton and exerted on each foot of the exoskeleton is written:

$$Z_{Ed}=K*R_{Nd}{}^{\alpha};$$

$$Z_{Eg}=K*R_{Ng}{}^{\alpha};$$

with $$K=(P_E-Z_B)/(P_U+Z_B)$$

in which $Z_{Ed}$ is the vertical component of the resultant of the balancing forces applied to the exoskeleton and measured under the right foot of the exoskeleton;

$Z_{Eg}$ is the vertical component of the resultant of the balancing forces applied to the exoskeleton and measured under the left foot of the exoskeleton;

$R_{Nd}{}^{\alpha}$ is the normal component of the bearing force measured under the right foot of the user, relative to the vertical in order to take into account the inclination of the foot by virtue of an equilibrium model and of the measurement of the inclination of the foot;

$R_{Ng}{}^{\alpha}$ is the normal component of the bearing force measured under the left foot of the user, projected onto the vertical in order to take into account the inclination of the foot;

$P_E$ is the weight of the exoskeleton;
$P_U$ is the weight of the user;
$Z_B$ is a predefined default assistance corresponding to a constant force applied by the exoskeleton to the user.

9. The method as claimed in claim 1, comprising controlling the actuators in such a way that the intensity of the vertical component of the resultant of the balancing forces applied to the exoskeleton and exerted on at least one foot of the exoskeleton is equal to a saturated value when the intensity of the vertical component of the bearing force measured under the corresponding foot of the user exceeds a predefined upper threshold value.

10. The method as claimed in claim 9, in which the saturated value is equal to the weight of the exoskeleton and/or the upper threshold value is between 0.5 decanewtons and 10 decanewtons.

11. The method as claimed in claim 9, in which the saturated value is equal to the weight of the exoskeleton plus the product of its mass by the vertical acceleration of its center of gravity and/or the upper threshold value is between 0.5 decanewtons and 10 decanewtons.

12. The exoskeleton as claimed in claim 9, in which the thigh segments and leg segments are indirectly linked to the user.

13. An exoskeleton comprising a pelvis element on which are articulated two lower limbs extending substantially parallel to the lower limbs of the user, each lower limb of the exoskeleton having a thigh segment articulated to a leg segment, which is itself articulated to a foot, each foot of the exoskeleton being connected to a corresponding foot of the user and comprising an interface on which the foot of the user rests, the exoskeleton being provided with actuators controlling the joints connecting the lower limbs to the pelvis element and the thigh segments to the leg segments, the joint articulating the foot to the leg segment remaining free, the exoskeleton likewise comprising measurement means for measuring the normal component, with respect to a bearing plane of the foot, of a bearing force under each foot of the user, and a processing and control unit connected to the measurement means and to the actuators and arranged for performing the steps of claim 1.

* * * * *